United States Patent
Tanaka et al.

(10) Patent No.: US 6,731,358 B2
(45) Date of Patent: May 4, 2004

(54) COLOR LIQUID CRYSTAL PANEL AND COLOR LIQUID CRYSTAL DISPLAY APPARATUS

(75) Inventors: Jun Tanaka, Chigasaki (JP); Shinji Sekiguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 09/797,720

(22) Filed: Mar. 5, 2001

(65) Prior Publication Data

US 2002/0012083 A1 Jan. 31, 2002

(30) Foreign Application Priority Data

Jul. 28, 2000 (JP) .......................... 2000-233150

(51) Int. Cl.[7] .................. G02F 1/1335; G02F 1/136; G02F 1/1333
(52) U.S. Cl. .................. 349/108; 349/42; 349/106; 349/138
(58) Field of Search .................. 349/106–108, 349/104, 42–43

(56) References Cited

U.S. PATENT DOCUMENTS 5,818,550 A * 10/1998 Kadota et al. ................ 349/43
6,445,432 B2 * 9/2002 Yamamoto et al. .......... 349/106

* cited by examiner

Primary Examiner—Dung Nguyen
(74) Attorney, Agent, or Firm—Antonelli, Terry, Stout & Kraus, LLP

(57) ABSTRACT

There are provided on one substrate of a pair of substrates which sandwich liquid crystal: thin-film transistor elements arranged in a matrix shape in correspondence with pixels; a wiring portion of the thin-film transistor elements; a pixel electrode; and a color filter layer formed between the pixel electrode and an inorganic insulating layer for covering the wiring portion of the thin-film transistor elements, and the color filter layer includes at least a lower light-transmission flatted layer and a primary-color-type colored pattern, and is provided with an opening through which a connection portion of the wiring portion of the thin-film transistor element and the pixel electrode is penetrated. With employment of this structure, the thin-film transistor and the color filter can be formed on the same substrate, and a deterioration in the spectral characteristic of the color filter can be suppressed.

7 Claims, 17 Drawing Sheets

Ec : END-CAP BASIC SKELETON
Ar¹ : ACID ANHYDRIDE STRUCTURE BASIC SKELETON
Ar² : DIAMIME STRUCTURE BASIC SKELETON

COLOR LIQUID CRYSTAL PANEL AND COLOR LIQUID CRYSTAL DISPLAY APPARATUS

BACKGROUND OF THE INVENTION

The present invention is related to a liquid crystal display technique, and more specifically, to an active-matrix-type color liquid crystal display technique using switching elements such as thin-film transistors (will be abbreviated as "TFT" hereinafter) and color filters in pixel units.

Recently, as a flat panel display, a color liquid crystal display apparatus has been attracted. In particular, since an active-matrix-type color liquid crystal display apparatus (TFT-LCD) has the superior image qualities, it is widely used as a display for a personal computer.

Normally, in such a color liquid crystal display apparatus, a TFT substrate in which TFT elements are formed on a one-side inner surface of a pair of substrates, and a color filter substrate in which color filter patterns are formed on the other inner surface are overlapped with each other, and then liquid crystal is filled between the substrates to constitute a liquid crystal display apparatus.

Currently, in such a liquid crystal display apparatus, it is required to improve the image quality, so that higher precision thereof is required. In general, when the pixel size is decreased, high precision can be realized in a substrate having the same screen size. However, since the wiring width and the dimension of a thin-film transistor cannot be reduced in proportional to the pixel size, the aperture ratio within a single pixel is lowered.

Furthermore, in view of the recent productivity, such a method of manufacturing a liquid crystal display apparatus is employed in which a large-sized glass substrate is used, the substrates are overlapped with each other in a batch mode, and multi-plane cutting is carried out. In this method, since the TFT substrate and the color filter substrate are overlapped with each other, overlap margin would be reduced when the substrate size is increased and the pixels on the TFT side and the pixels on the color filter side are decreased. As a result, the aperture ratio and the productivity would be lowered.

To avoid this difficulty, as JP-A-10-39292 for example, it is proposed such a structure that the filter is formed on the substrate provided with the color TFT elements. In the description of the patent application, the protection film is formed on the switching element, the signal lines and the scanning lines in order to prevent ions or elements (e.g., copper ions and zinc ions), which are contained in pigment, dye, ink, or the like employed to form the color filter, from entering into the switching element portions formed on the array substrate. Thereby, it is possible to prevent the malfunction and the erroneous operations of the switching elements. The protection film is formed using the organic material or the inorganic material.

SUMMARY OF THE INVENTION

However, in the above-described so-called "active-matrix-type liquid crystal display element", there are the following problems. That is, in case that the above-described protection film is formed using organic material such as an epoxy resin or an acrylic resin, an alkali water solution developing fluid is generally employed while the color filter is formed. The protection film made of the organic material cannot shield water components. Depending upon sorts of wiring layers, the wiring layers are corroded by alkali components and water components, and the switching elements are damaged and/or operated under error state by the invaded alkali components.

On the other hand, in case that the protection film is formed by inorganic material, the flatness thereof is deteriorated, so that the difference in level of the element structures thereunder cannot be eliminated. As a result, the thickness of the color filter pattern formed thereon is fluctuated, which may deteriorate the spectral characteristic of the color filter.

A problem to be solved by the present invention is to realize a technique by which the spectral characteristic of the color filter is not deteriorated even when the protection film is formed by inorganic material.

An object of the present invention is to solve the above-explained problem, to improve the conventional technique, and to provide a color liquid crystal display technique in high precision and in high image quality by increasing the aperture ratio of a pixel to improve brightness.

In order to achieve the above-explained object, in the present invention:

(1) A color liquid crystal panel is constructed by forming on one substrate of a pair of substrates which sandwich liquid crystal, switching elements arranged in a matrix shape in correspondence with pixels; a wiring portion of the switching elements; a pixel electrode connected to the wiring portion; and a color filter layer formed between the pixel electrode and an inorganic insulating layer for covering the wiring portion of the switching elements, including a lower light-transmission flatted layer and a primary-color-type colored pattern, and provided with an opening through which a connection portion of the wiring portion of the switching elements and the pixel electrode is penetrated, and by forming a common electrode commonly used for plural pixels on the other substrate.

(2) A color liquid crystal panel is constructed by forming on one substrate of a pair of substrates which sandwich liquid crystal, switching elements arranged in a matrix shape in correspondence with pixels and made of thin-film transistor elements; a wiring portion of the switching elements; a pixel electrode connected to the wiring portion; and a color filter layer formed between-the pixel electrode and an inorganic insulating layer for covering the wiring portion of the switching elements, including a lower light-transmission flatted layer, a primary-color-type colored pattern and an upper light-transmission protection layer, and provided with an opening through which a connection portion of the wiring portion of the switching elements and the pixel electrode is penetrated, and by forming a common electrode commonly used for plural pixels on the other substrate.

(3) A color liquid crystal display apparatus is arranged by forming on one substrate of a pair of substrates which sandwich liquid crystal, switching elements arranged in a matrix shape in correspondence with pixels; a wiring portion of the switching elements; a pixel electrode connected to the wiring portion; and a color filter layer formed between the pixel electrode and an inorganic insulating layer for covering the wiring portion of the switching elements, including a lower light-transmission flatted layer and a primary-color-type colored pattern, and provided with an opening through which a connection portion of the wiring portion of the switching elements and the pixel electrode is penetrated, and by forming a common electrode commonly used for plural pixels on the other substrate, wherein the pixel electrode is driven by the switching elements in response to an image signal; and the liquid crystal is driven by a voltage applied between the pixel electrode and the common electrode to form an image.

(4) A color liquid crystal display apparatus is arranged by forming on one substrate of a pair of substrates which sandwich liquid crystal, switching elements arranged in a matrix shape in correspondence with pixels and made of thin-film transistor elements; a wiring portion of the switching elements; a pixel electrode connected to the wiring portion; and a color filter layer formed between the pixel electrode and an inorganic insulating layer for covering the wiring portion of the switching elements, including a lower light-transmission flatted layer, a primary-color-type colored pattern and an upper light-transmission protection layer, and provided with an opening through which a connection portion of the wiring portion of the switching elements and the pixel electrode is penetrated; and by forming a common electrode commonly used for plural pixels on the other substrate, wherein the pixel electrode is driven by the switching elements in response to an image signal; and the liquid crystal is driven by a voltage applied between the pixel electrode and the common electrode to form an image.

(5) In the above-described (3) or (4), the color filter layer is constructed so that the lower light-transmission flatted layer, the primary-color-type colored pattern and the upper light-transmission protection layer are made of photosensitive resin.

(6) In the above-described (3) or (4), the color filter layer is constructed so that the lower light-transmission flatted layer and the upper light-transmission protection layer are made of thermosetting resin.

(7) In the above-described (3), (4) or (5), the color filter layer is constructed so that the lower light-transmission flatted layer is a polyimide film in which a polyimide precursor whose molecular terminal is end-capped is imidized by heat-curing.

(8) In any one of the above-described (3) to (7), an external electrode terminal provided every wiring is covered with the inorganic insulating layer, is covered with at least one of the lower light-transmission flatted layer and the upper light-transmission protection layer, and is provided on a substrate which has an opening for exposing the external electrode terminal portion.

(9) A color liquid crystal display apparatus is arranged by forming on one substrate of a pair of substrates which sandwich liquid crystal, switching elements arranged in a matrix shape in correspondence with pixels; a pixel electrode connected to a wiring portion of the switching elements; a common electrode arranged substantially parallel to a longitudinal direction of the pixel electrode and substantially along a plane direction, and commonly used to plural pixels; a color filter layer formed among the common electrode, the pixel electrode and an inorganic insulating layer for covering the wiring portion of the switching elements, and including a lower light-transmission flatted layer and a primary-color-type colored pattern, wherein the pixel electrode is driven by the switching elements in response to an image signal; and the liquid crystal is driven by a voltage applied between the pixel electrode and the common electrode to form an image.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Referring now to drawings, an embodiment of a color liquid crystal panel according to the present invention will be described in detail.

Figure 1:
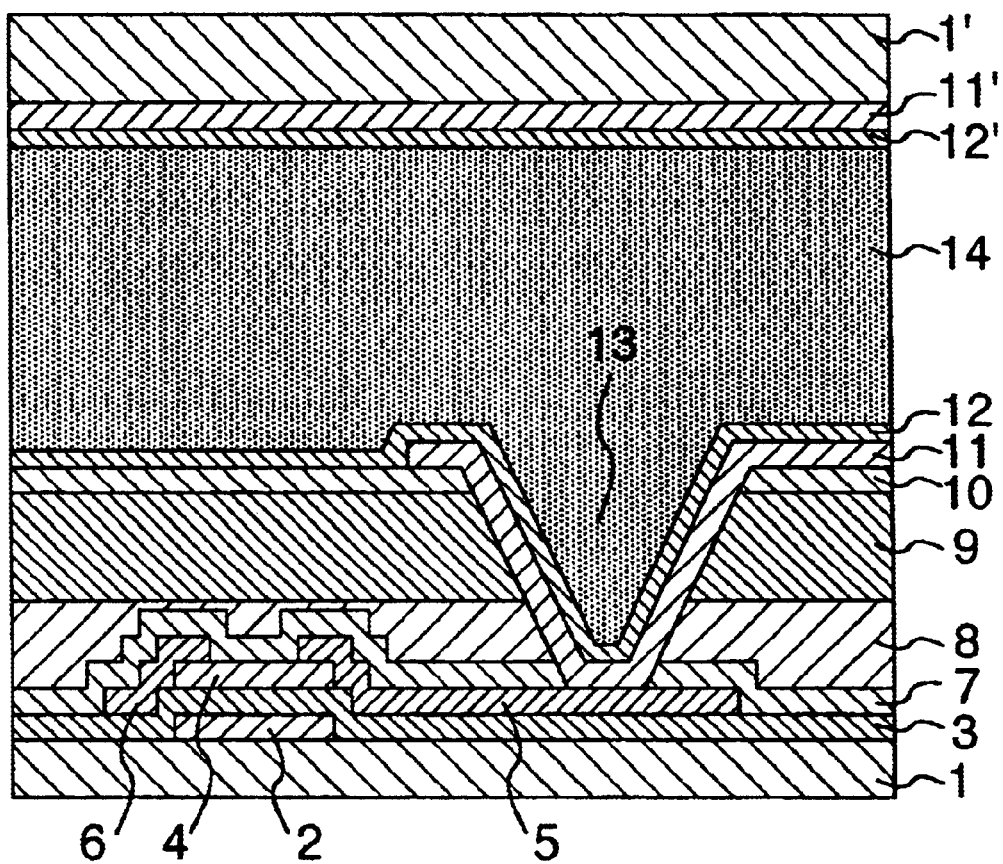
FIG. 1 is a sectional view of a color liquid crystal panel for explaining a first embodiment.

FIG. 1 is a sectional view of a color liquid panel according a first embodiment. Reference numeral 1 denotes a substrate, 2 denotes a gate electrode, 3 denotes an inorganic insulating layer which covers the gate electrode 2, 4 denotes a TFT (thin-film transistor), 5 denotes a source electrode, 6 denotes a drain electrode, 7 denotes an inorganic insulating layer which covers the entire color liquid crystal panel, 8 denotes a flatted layer, 9 denotes a color filter, 10 denotes a protection film, 11 denotes a pixel electrode, and 12 is a polyimide orientation film.

The gate electrode 2 on which the inorganic insulating layer 3 for covering the gate electrode 2 is formed is formed on the substrate 1. Then, the thin-film transistor (TFT) 4 is formed on the inorganic insulating layer 3, and the source electrode 5 and the drain electrode 6 are formed so as to be connected to the TFT 4. The inorganic insulating layer 7 for covering the entire construction is formed. Furthermore, the flatted layer 8 which is transparent in the visible light region is formed on the inorganic insulating layer 7, and the primary-color-type color filter 9 is formed on the flatted layer 8. The surface of the color filter 9 is covered with the protection film 10 which is transparent in the visible light region. An opening 13 penetrating the inorganic insulating layer 7, the flatted layer 8, the color filter 9 and the color filter protection layer 10 is provided. The pixel electrode 11, which is formed on the upper layer of the color filter layer via the opening portion, and the source electrode are connected.

For the substrate on which such an element wiring and the color filter are formed, the polyimide orientation film 12 for orientating a liquid crystal to the display region is formed on a surface layer thereof. A transparent electrode 11' is formed in a display region on the surface of a substrate 1', and a polyimide orientation film 12' for orientating the liquid crystal is formed on the surface layer. The peripheral portions of the two substrates are sealed with a seal agent to fill the liquid crystal 14 thereinto. In this manner, the color liquid crystal panel shown in FIG. 1 is completed.

Next, a concrete description will now be made of a manufacturing process of the color liquid crystal panel shown in FIG. 1.

First, while non-alkali glass for the TFT, which is approximately 0.7 mm thick, is used as the substrate 1. The electrode material constituting the gate electrode is formed on the non-alkali glass. The gate electrode 2 is formed by patterning by way of the photolithographic technique using the photo-resist. In this structural example, as the gate electrode 2, a chromium film approximately 100 nm thick is formed by way of the sputtering method.

Furthermore, as the gate insulating film 3, an SiN film approximately 300 nm thick is formed by way of the plasma CVD (Chemical Vapor Deposition) method on the entire surface of the substrate so as to cover the gate electrode. In addition, the thin-film transistor 4 is formed via the gate insulating film on the gate electrode 2 by way of the photolithographic technique. In this structural example, the TFT (thin-film transistor) 4 is formed using an amorphous silicon film or a polycrystal silicon film so that the thickness thereof is approximately 300 nm.

Then, the source electrode 5 and the drain electrode 6 are formed so as to overlap with a portion of the TFT. These are formed using an aluminum film approximately 300 nm thick by way of the sputtering method. Furthermore, the insulating film 7 covering these electrodes is formed. In this structural example, the insulating film 7 is formed using an SiN film approximately 500 nm thick by way of the plasma CVD method.

Also, regarding the lower flatted film 8 of the color filter layer, for example, photosensitive material having alkali developing characteristic is coated by way of the slit method, and is heated at temperature of about 90° C. for approximately 30 minutes using an oven furnace or the like. Thereafter, it is exposed by way of the photolithographic technique using a predetermined photo-mask, and is patterned using an organic alkali developing fluid to form an opening by which the under-layer insulating film 7 is exposed. Then, it is heated at temperature of about 230° C. for approximately 30 minutes to be cured, so that the lower light-transmission flatted film 8 approximately 0.8 µm thick is formed.

Also, a black matrix for light-shielding the wiring portion of the element substrate, which is approximately 1.1 µm thick, is formed. The black matrix is manufactured in the following manner. Resin material is coated by way of the slit method, and then is heated at temperature of about 90° C. for approximately 30 minutes using an oven furnace or the like. Thereafter, it is exposed by way of the photolithographic technique, and then is patterned using an organic alkali developing fluid to form a pattern for light-shielding the wiring including the opening for exposing the under-layer insulating film 7. Then, it is again heated at temperature of about 210° C. for approximately 30 minutes using the oven furnace or the like to be cured.

Also, a red filter pattern approximately 1.5 µm thick is formed. The red filter pattern is formed in the following manner. Red filter material is coated by way of the slit method, and then is heated at temperature of about 90° C. for approximately 30 minutes using the oven furnace or the like. Thereafter, it is exposed by way of the photolithographic technique using a predetermined photo-mask, and then is patterned using an organic alkali developing fluid. Then, it is again heated at temperature of about 210° C. for approximately 30 minutes to be cured.

A green filter pattern approximately 1.5 µm thick is also formed. The green filter pattern is manufactured using green filter material in a similar process to that of the red filter pattern explained above.

A blue filter pattern approximately 1.5 µm thick is also formed. A manufacturing method of the blue filter pattern is substantially identical to that of the red or green filter described above.

The upper protection film 10 of the color filter layer, which is approximately 0.3 µm thick, is formed. The protection film 10 is formed in the following manner. Photosensitive material having alkali developing characteristic is coated by way of the slit method, and then is heated at temperature of about 90° C. for approximately 30 minutes using the oven furnace or the like. Thereafter, it is exposed by way of the photolithographic technique using a predetermined photo-mask, and then is patterned using an organic alkali developing fluid to form the opening 13 for exposing the under-layer insulating film 7. Then, it is again heated at temperature of about 230° C. for approximately 30 minutes to be cured.

Also, the opening portion 13 of the color filter layer for exposing the under-layer insulating film 7 is formed by removing the under-layer insulating film using the color filter layer as a mask and using a mixture gas made of $CF_4$ and $O_2$ (mixture ratio of $CF_4$ to $O_2$ is equal to about 95% to about 5%, approximately) to expose the source electrode 5.

A pixel electrode layer (ITO film) approximately 130 nm thick is formed on the color filter layer over the entire display region of the substrate. As a result, in the opening portion 13 for exposing the source electrode 5, the pixel electrode and the source electrode 5 are connected.

Next, a positive-type photo-resist film is coated on the pixel electrode layer 11 by way of the spin coat method, and then is exposed using a photo-mask by way of the photo-lithographic technique. Thereafter, it is patterned using an organic alkali developing fluid to form a pattern for exposing the ITO film. Then, the exposed ITO film is dissolued and removed using a water solution fluid of 25%-HBr while the resist film is used as a mask. As a result, the ITO film is formed on the pixel pattern.

Next, polyimide orientation film material is coated by way of the printing method, and then is heat-cured. Thereafter, the surface of the polyimide orientation film is processed by the rubbing process and the washing process to form the polyimide orientation film 12.

On the side of the substrate 1', a pixel electrode layer 11' (ITO film) approximately 130 nm thick is formed on a non-alkali glass approximately 0.7 mm thick over the entire display region of the substrate using a mask. On the pixel electrode layer, orientation film material such as polyimide is coated by way of the printing method, and then is heat-cured. Thereafter, the surface of this orientation film is rubbing-processed by the rubbing process or the like and is washed to form an orientation film 12'. Micro pearl is distributed on the surfaces of the substrate 1 and the substrate 1', and is heated to be hardened.

Thereafter, liquid crystal is filled between the both substrates. Also, a driver IC for the driving electrodes is mounted on the peripheral portions of the substrates.

With employment of the above-explained structure, the switching element such as the TFT and the color filter can be formed on the same substrate. Also, the TFT element and the wiring layer are protected by the inorganic insulating film, so that it is possible to avoid the invasion of the alkali developing fluid when the color filter layer 9 is formed. As a result, the damages or the erroneous operations of the wiring or the switching element can be prevented.

Furthermore, since the organic flatted layer is formed on the inorganic insulating film, the thickness of the color filter pattern formed on this layer can be made uniform, so that the deterioration of the color filter spectral characteristic can be prevented. As a result, a color liquid crystal display apparatus having the high precision and the improved image quality due to the increased aperture ratio of the pixel can be provided.

Figure 2:
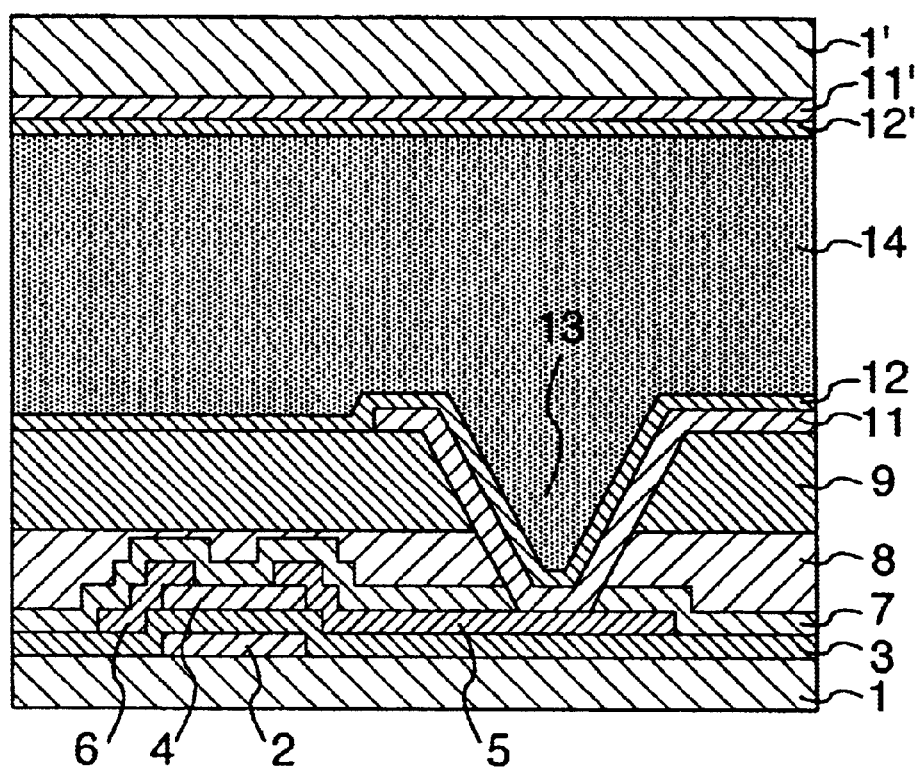
FIG. 2 is a sectional view of a color liquid crystal panel for explaining a second embodiment.

FIG. 2 is a sectional view of color liquid crystal panel according to a second embodiment. The structure of the second embodiment is different from that of the first embodiment in that any upper protection film 10 is not formed on the color filter 9. Other structural elements and the manufacturing method are similar to those of the first embodiment.

In FIG. 2, the gate electrode 2 is formed on the substrate 1, on which the inorganic insulating layer 3 for covering the gate electrode 2 is formed. Then, the thin-film transistor (TFT) 4, the source electrode 5, the drain electrode 6 and the inorganic insulating layer 7 for covering the entire construction are formed on the insulating layer 3. Furthermore, the flatted layer 8 which is transparent in the visible light region is formed on the flatted layer 8, on which the primary-color-type color filter 9 is formed.

In the color filter 9, the inorganic insulating layer 7 and the flatted layer 8, the opening 13 penetrating them is provided. The pixel electrode 11, which is formed on the upper layer of the color filter layer, is connected to the source electrode 5 via the opening portion.

For the substrate on which such element wiring and the color filter 9 are formed, the polyimide orientation film 12 for orientating the liquid crystal to the display region is formed on the surface layer. The transparent electrode 11' is formed in the display region on the surface of the substrate 1', and the polyimide orientation film 12' for orientating the liquid crystal is also formed on the surface layer. Between the two substrates 1 and 1', the peripheral portions are sealed by the seal agent, so that the liquid crystal 14 is filled into the substrates. An SiN film and an $SiO_2$ film in a single-layer form or a plural-layer stacked form can be used as the gate insulating film 3 and the insulating film 7, respectively.

The functions and the effects achieved by the construction of the second embodiment are similar to those as explained in the first embodiment.

Figure 3:
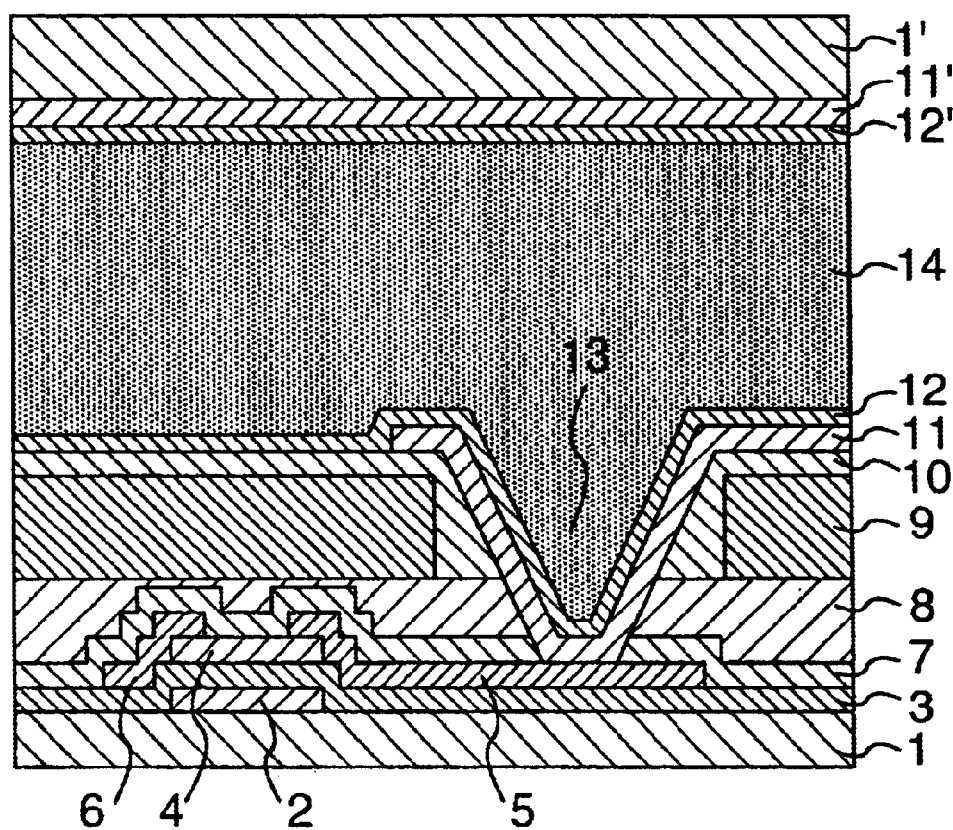
FIG. 3 is a sectional view of a color liquid crystal panel for explaining a third embodiment.

FIG. 3 is a sectional view of a color liquid crystal panel according to a third embodiment. The structure of the third embodiment is different from that of the first embodiment in that a coloring pattern edge portion is covered with the upper protection film layer and does not contact with the pixel electrode layer in the opening portion.

Similar to the first embodiment, the third embodiment uses the substrate 1 on which the structural elements up to the lower flatted film 8 of the color filter layer are formed, and the black matrix pattern, the red filter pattern, the green filter pattern and the blue filter pattern are formed in a manner similar to that of the first embodiment. At this time, for the opening portion of the lower flatted film 8, the above-explained four patterns form a larger opening.

The upper protection film 10 of the color filter layer 9 is formed in the following manner. Photosensitive material having alkali developing characteristic is coated by way of the slit method, and then is heated at temperature of about 90° C. for approximately 30 minutes using an oven furnace or the like. Thereafter, it is exposed by way of the photo-lithographic technique using a photo-mask, and then is patterned using an organic alkali developing fluid to form an opening for exposing the under-layer insulating film 7. Then, it is heated at temperature of about 230° C. for approximately 30 minutes to be cured to form a film (upper protection film 10) approximately 0.3 $\mu$m thick.

In the opening portion of the color filter layer, the under-layer insulating film 7 is removed by way of the dry etching process using a mixture gas of $CF_4$ and $O_2$ to expose the source electrode 5. The pixel electrode (ITO film) 11 approximately 130 nm thick is formed above the color filter layer 9 and within the opening portion 13 over the entire display region of the substrate using a mask, and is connected to the source electrode 5 via the opening portion 13.

It could be confirmed that similar effects to those as explained in the first embodiment could be achieved by the above-explained construction.

Figure 4:
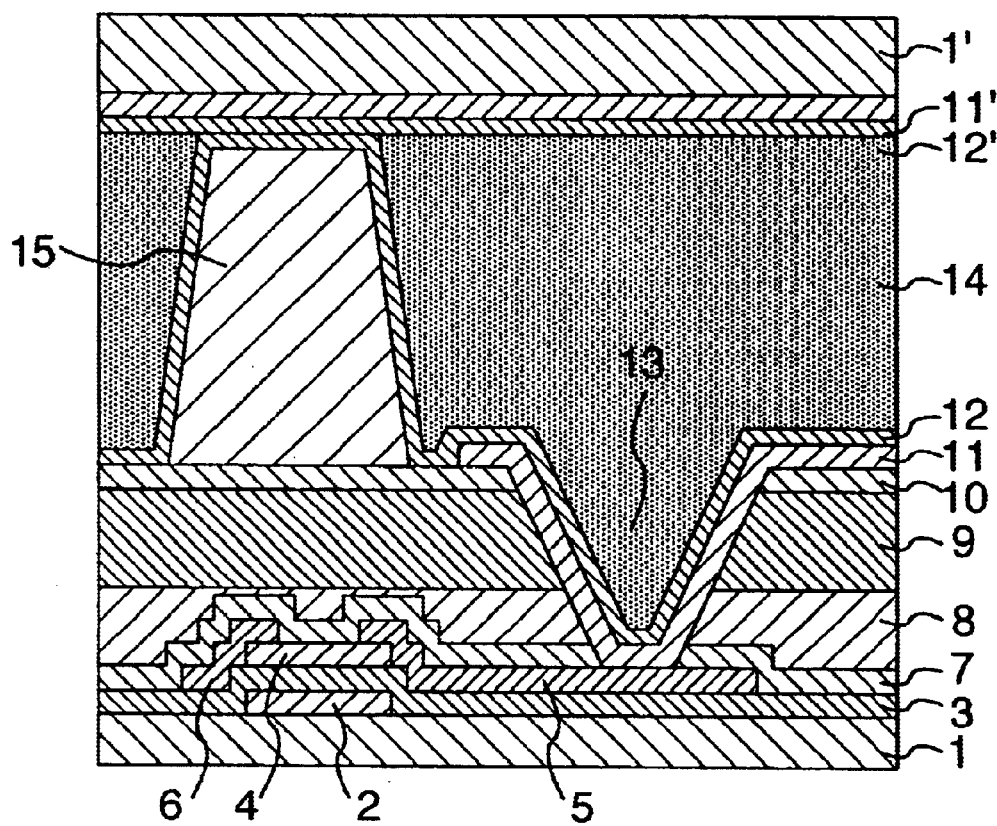
FIG. 4 is a sectional view of a color liquid crystal panel for explaining a fourth embodiment.

Next, FIG. 4 indicates a sectional view of a color liquid crystal panel according to a fourth embodiment. In this case, it is different from the above-described structure of the first embodiment in that a column-shaped spacer 15 is formed in a liquid crystal filling portion.

In accordance with the structure of the fourth embodiment, since the thickness of the liquid crystal layer (referred to as "cell gap") can be defined by the column-shaped spacer fixed at a desirable arranging place, the superior effects capable of avoiding the following problem or the like may be achieved. That is, when a micro pearl is used, the micro pearl is entered into the opening portion connecting the upper pixel electrode and the lower electrode of the color filter layer, so that a desirable cell gap can not be formed.

Figure 5:
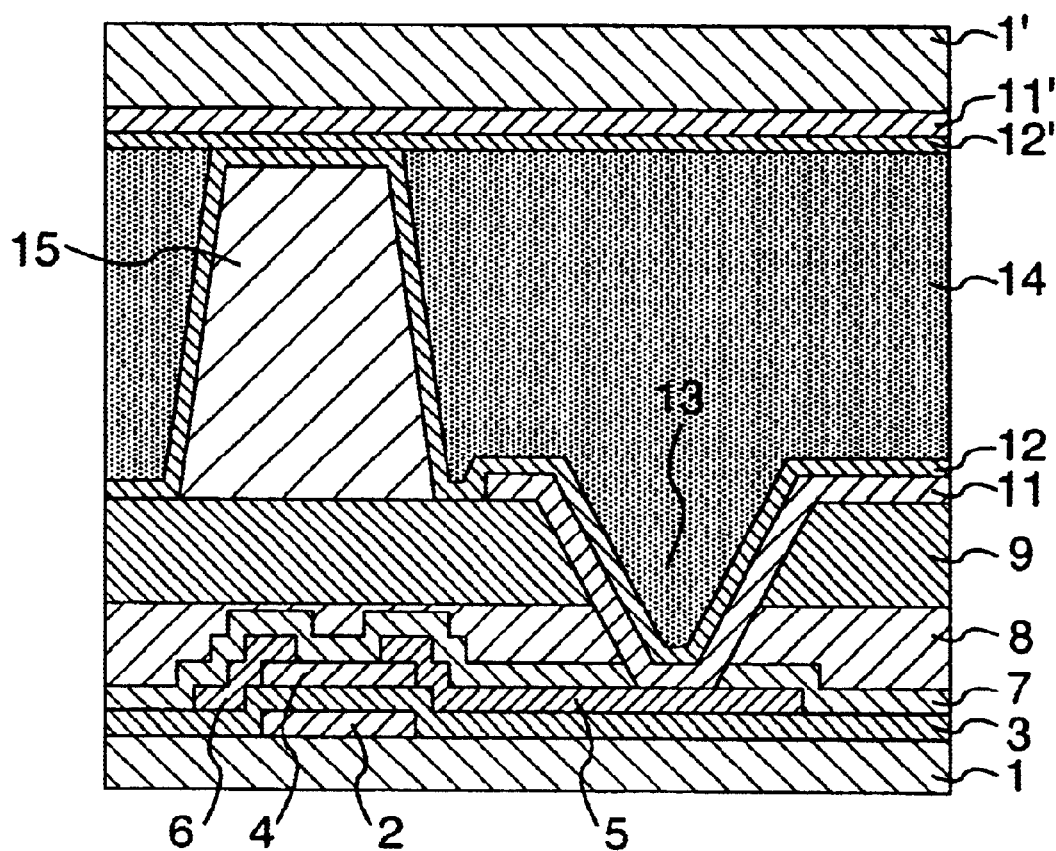
FIG. 5 is a sectional view of a color liquid crystal panel for explaining a fifth embodiment.

Next, FIG. 5 indicates a sectional view of a color liquid crystal panel according to a fifth embodiment. In this case, it is different from the described-above structure of second embodiment in that the column-shaped spacer 15 is formed in the liquid crystal filling portion. However, effects similar to those of the above-described fourth embodiment can be achieved.

Figure 6:
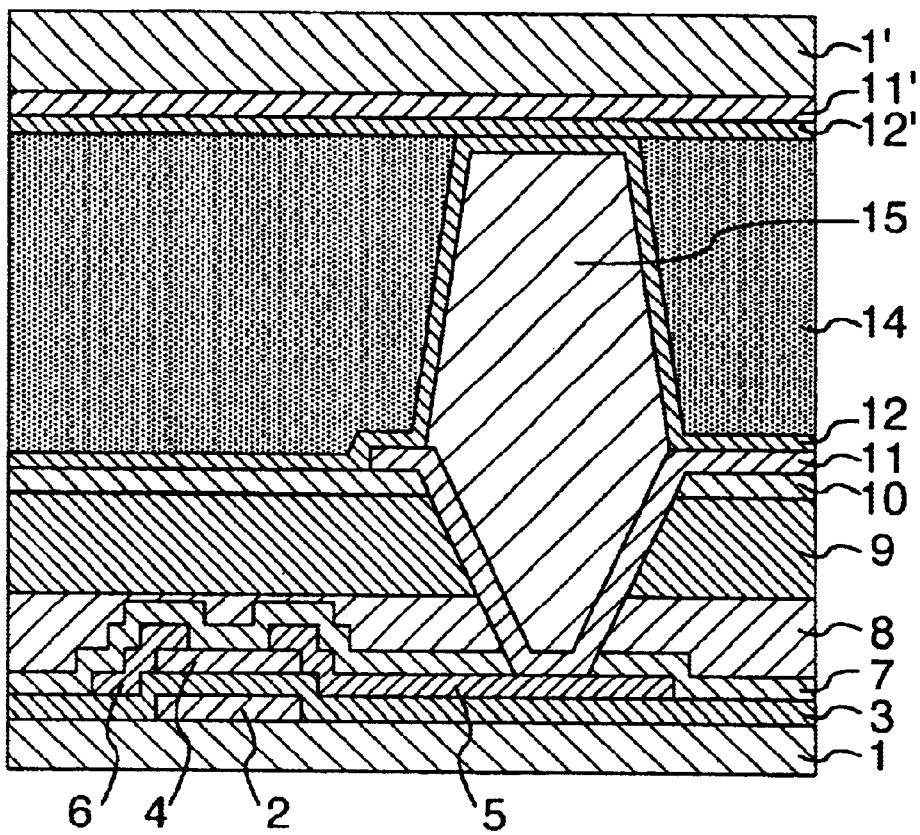
FIG. 6 is a sectional view of a color liquid crystal panel for explaining a sixth embodiment.

Next, FIG. 6 indicates a sectional view of a color liquid crystal panel according to a sixth embodiment. In this case, it is different from the above-described structure of the fourth embodiment in that the column-shaped spacer 15 is formed in the opening portion.

Generally, in the processing after forming the spacer, contamination and very small articles are entered into the button portion of the opening, so that the liquid crystal is contaminated. As a result, critical defects such as improper display are occurred. However, in the above-explained structure of the sixth embodiment, the opening is closed by the spacer, so that it is possible to prevent the entering of the contamination and the very small articles into the opening portion. As a consequence, the superior effect to avoid such a problem as the improper display may be achieved.

Figure 7:
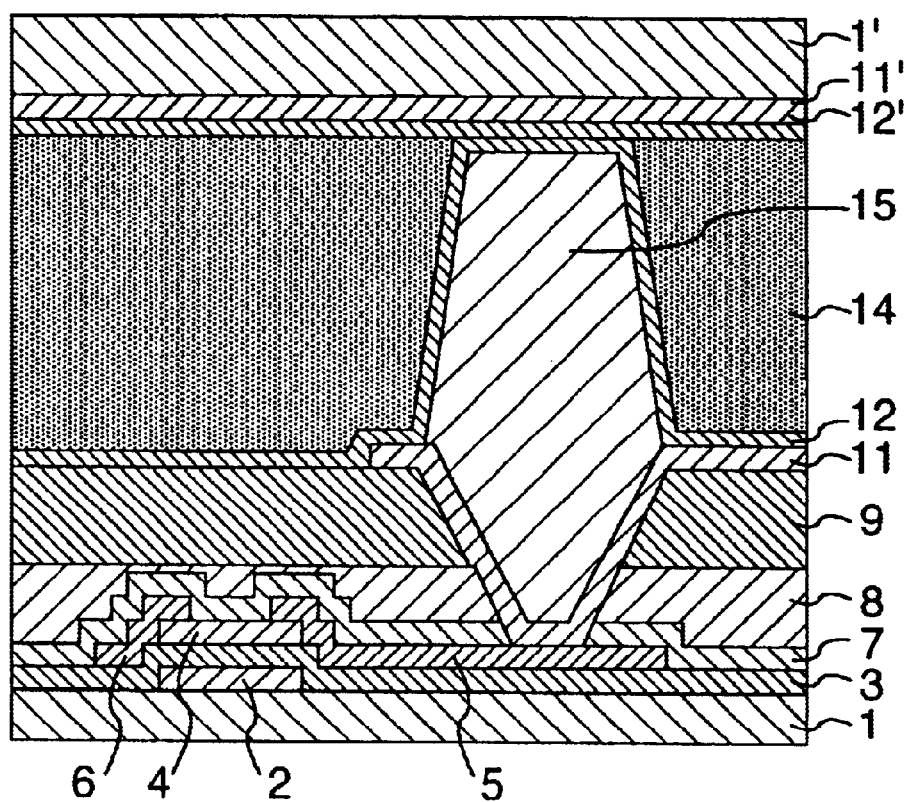
FIG. 7 is a sectional view of a color liquid crystal panel for explaining a seventh embodiment.

Next, FIG. 7 indicates a sectional view of a color liquid crystal panel according to a seventh embodiment. In this case, it is different from the above-described structure of the fifth embodiment in that the column-shaped spacer 15 is formed above the opening portion. However, effects similar to those of the above-described sixth embodiment can be achieved.

Figure 8:
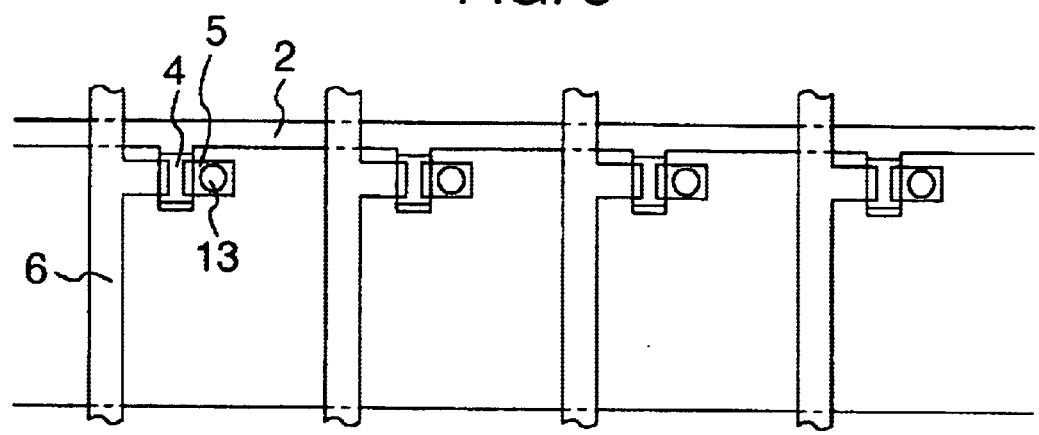
FIG. 8 is a schematic diagram for showing a plane structure of a color liquid crystal panel on which thin-film transistors are arranged, in an embodiment of the present invention.
Figure 9:
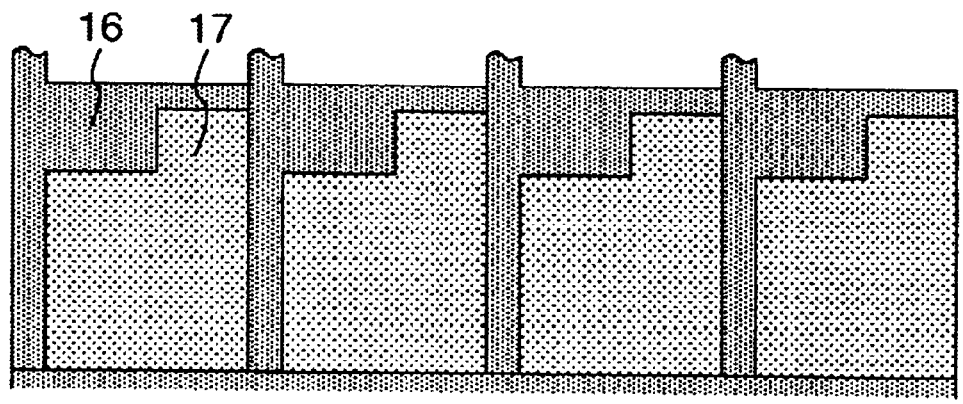
FIG. 9 is a first schematic diagram for representing an arrangement example of a black matrix pattern and a color filter pattern in an embodiment of the present invention.
Figure 10:
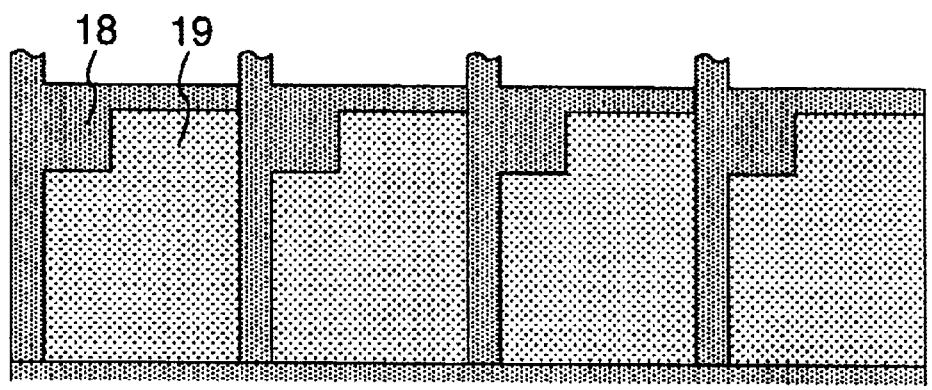
FIG. 10 is a second schematic diagram for representing the arrangement example of the black matrix pattern and the color filter pattern in an embodiment of the present invention.

Now, FIG. 8 is a plan view of a liquid crystal panel on which a thin-film transistor is arranged. The opening portion 13 of the ITO film is in a circular shape. As a result, the opening portion may be readily made in a taper form, so that the upper portion and the lower portion of the opening portion 13 does not cause the stepped portions of the ITO film.

Figure 11:
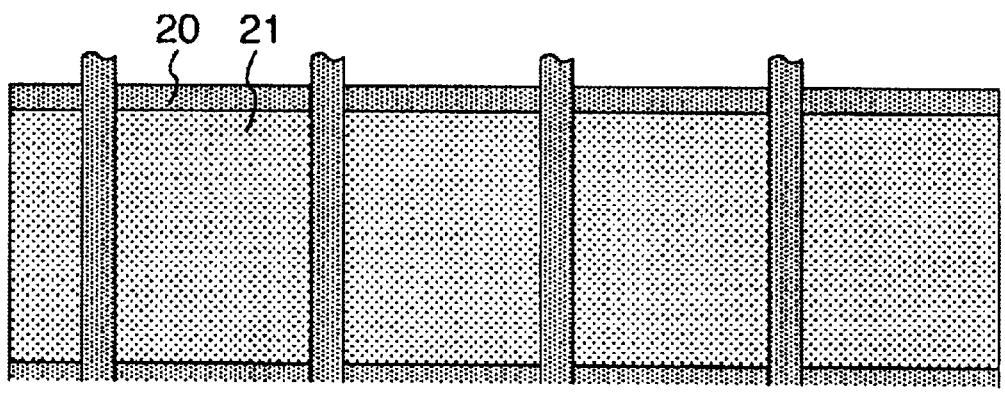
FIG. 11 is a third schematic diagram for representing the arrangement example of the black matrix pattern and the color filter pattern in an embodiment of the present invention.
Figure 12:
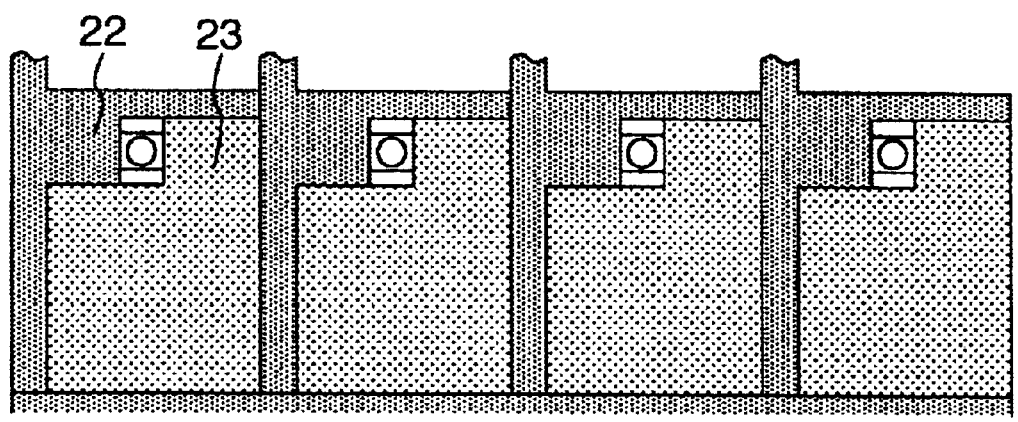
FIG. 12 is a fourth schematic diagram for representing the arrangement example of the black matrix pattern and the color filter pattern in an embodiment of the present invention.

Also, the positions of the black matrix patterns 16, 18, 20 and 22, and the positions of the color filter patterns 17, 19, 21 and 23 are the positions shown in FIGS. 9, 10, 11 and 12 corresponding to the plane structure shown in FIG. 8. Among these drawings, FIG. 11 shows a structural example in which the black matrix pattern 20 is located on the gate electrode and the drain electrode wiring.

Subsequently, a description will now be made of a color liquid crystal panel according to an eighth embodiment.

Thermosetting material is coated by way of the slit method on the substrate 1 on which the constructive elements up to the inorganic insulating layer as explained in the above first embodiment have been coated. The thermosetting material is heated at temperature of approximately 90° C. for about 30 minutes, and then is heated at temperature of approximately 230° C. for about 30 minutes to be cured. As a result, a lower flatted film approximately 0.5 $\mu$m thick is formed over the entire surface of the substrate. On the lower flatted film, the black matrix pattern, the red filter pattern, the yellow filter pattern and the blue filter pattern are formed.

Furthermore, the upper protection film of the color filter layer is formed in the following manner. Thermosetting material is coated on the substrate by way of the slit method. Similarly, the thermosetting material is heated at temperature of approximately 90° C. for about 30 minutes, and then is heated at temperature of approximately 230° C. for about 30 minutes to be cured. As a result, the upper protection film for the color filter layer, which is approximately 0.5 $\mu$m thick, is formed over the entire surface of the substrate. On this lower flatted film, the black matrix pattern, the red filter pattern, the yellow filter pattern and the blue filter pattern are formed.

Figure 13:
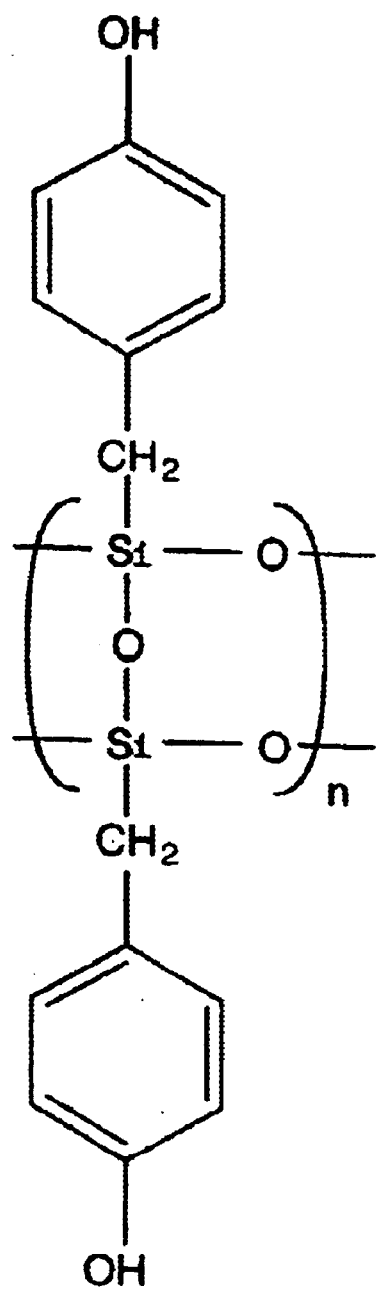
FIG. 13 is a diagram for indicating a structure of a base polymer of an organic silicon resist.

Next, a positive-type silicon-containing polymer resist film which is made by combining base polymer having a structure shown in FIG. 13 with a naphthoquinone azide photosensitive agent is coated on the upper protection film by way of the slit method. It is heated at temperature of about 90° C. for approximately 30 minutes. Then, it is exposed via a mask, and is developed using the alkali developing fluid to remove an exposed portion thereof. As a result, a desirable pattern used to expose the color filter layer is formed. At this time, the silicon-containing polymer film approximately 0.4 $\mu$m thick is formed.

Next, since the silicon-containing polymer film may have the resistive characteristic with respect to dry etching of $O_2$ gas, it is used as a mask to dry-etch and remove the color filter layer in the isotropic $O_2$-ashing process. Thus, an opening is formed to expose the inorganic insulating layer.

Next, the dry etching process is carried out using a mixture gas of $CF_4$ and $O_2$ (mixing ratio of $CF_4$ to $O_2$ is equal to about 95% to about 5%). At this time, since the organic silicon-series resist film does not have the resistive characteristic with respect to the $CF_4$ gas, it is removed together with the insulating layer. While the color filter layer may constitute a mask, the under-layer insulating film is dry-etched to be removed, so that an opening portion is formed through which the source electrode 5 is exposed.

Next, while using a mask, the pixel electrode layer (ITO film) approximately 130 nm thick is formed on the color filter layer with respect to the entire surface of the display region of the substrate to connect the pixel electrode and the source electrode in the opening portion through which the source electrode is exposed.

The color liquid crystal panel shown in FIG. 1 may be accomplished in this manner.

Next, a description will now be made of a color liquid crystal panel according to a ninth embodiment.

Figure 14:
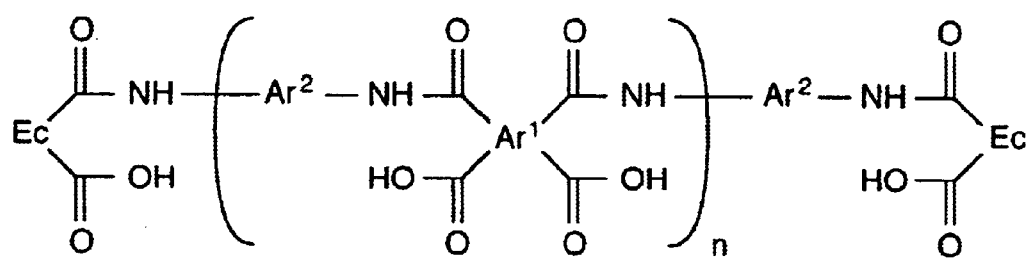
FIG. 14 is a diagram for indicating a basic skeleton structure of an end-capped polyimide.
Figure 15:
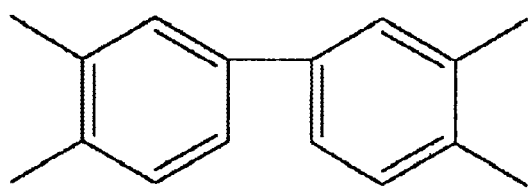
FIG. 15 is a structural diagram for explaining a first example of $Ar^1$ structure of the end-capped polyimide.
Figure 16:
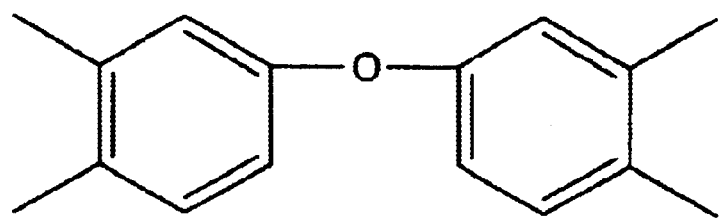
FIG. 16 is a structural diagram for explaining a second example of $Ar^1$ structure of the end-capped polyimide.
Figure 17:
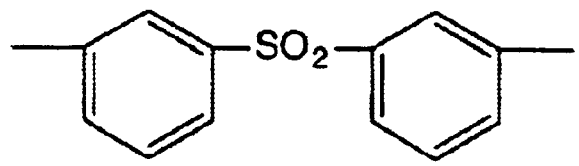
FIG. 17 is a structural diagram for explaining a first example of $Ar^2$ structure of the end-capped polyimide.
Figure 18:
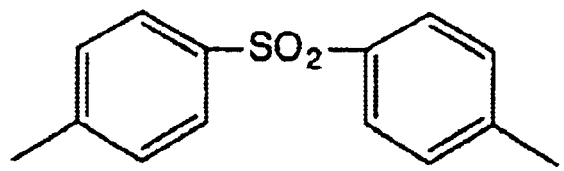
FIG. 18 is a structural diagram for explaining a second example of $Ar^2$ structure of the end-capped polyimide.
Figure 19:
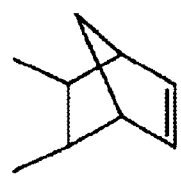
FIG. 19 is a diagram for showing an Ec structural example of the end-capped polyimide.

An N-methyl-2-pyrrolidone solution of an end-capped polyimide precursor is coated on the substrate, on which the constructive elements up to the inorganic insulating layer as explained in the first embodiment have been formed, by way of the slit coating method. The end-capped polyimide precursor has a basic structure shown in FIG. 14 in which $Ar^1$ shown in FIG. 13 has a structure shown in FIG. 15 or FIG. 16, $Ar^2$ has a structure shown in FIG. 17 or FIG. 18, and Ec shown in FIG. 13 has a structure shown in FIG. 19. The coated solution is heated at temperature of approximately 90° C. for about 30 minutes, and then is heated within nitrogen atmosphere at temperature of about 200° C. for approximately 30 minutes, and furthermore is heated at temperature of about 250° C. for approximately 30 minutes to be cured. As a result, the lower flatted film of the color filter layer, which is 0.8 $\mu$m thick, is formed over the entire surface of the substrate.

Since the polyimide has the above-explained basic skeleton structure, it becomes transparent within the visible light region. The end-cap structure corresponds to a bridging structure upon thermosetting at high temperature. Since polymer may be melted before the bridging, it is possible to form the film having the superior flatness of the surface thereof. Furthermore, since the end-cap structure is bridged, it is possible to form the film having the better physical characteristic.

Next, similar to the case of the first embodiment, the black matrix pattern, the red filter pattern, the green filter pattern and the blue filter pattern are formed. Then, the upper protection film of the color filter layer approximately 0.3 μm thick is formed over the entire surface of the substrate in the following manner. Thermosetting material is coated by way of the slit method. Thereafter, it is heated at temperature of approximately 90° C. for about 30 minutes, and then is heated at temperature of approximately 230° C. for about 30 minutes to be cured. Subsequently, a description will now be made of a method for manufacturing an external electrode terminal portion, which is provided every wiring at a peripheral portion of an element substrate, with reference to the above-explained first embodiment.

Figure 20:
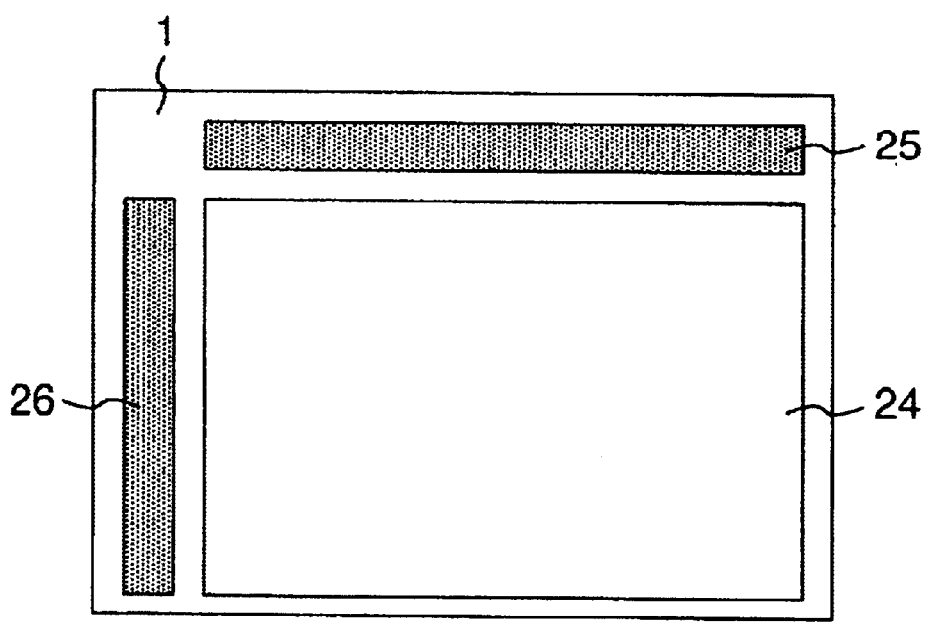
FIG. 20 is a plane view for explaining a display region (pixel region) and an external terminal region of a color crystal panel.
Figure 21:
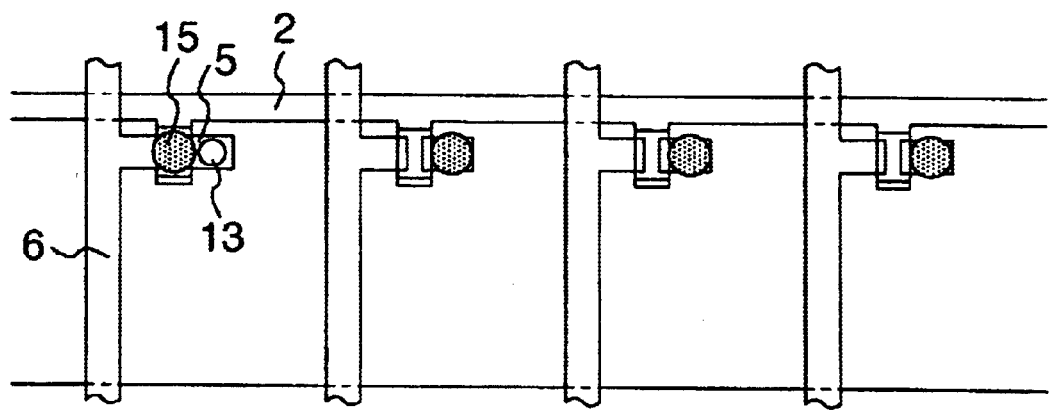
FIG. 21 is a first schematic diagram for showing an arrangement of a column-shaped spacer in a color crystal panel.
Figure 22:
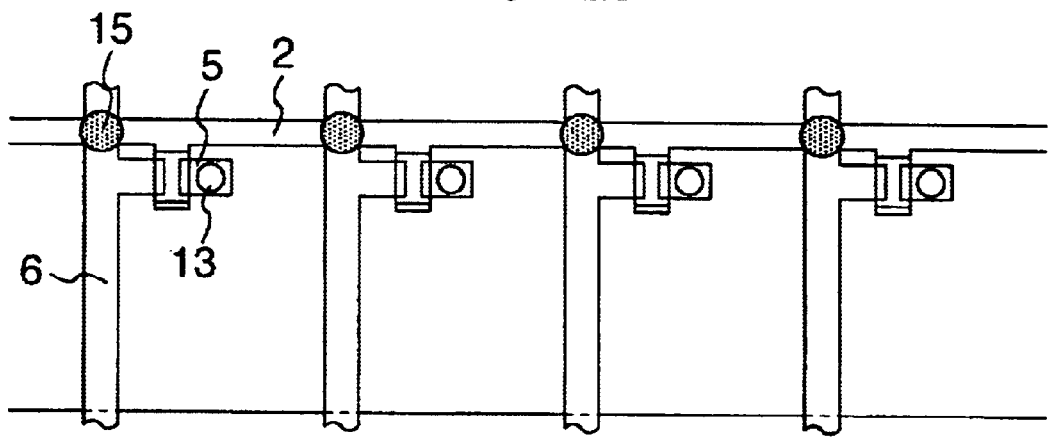
FIG. 22 is a second schematic diagram for showing the arrangement of the column-shaped spacer provided in the color crystal panel.
Figure 23:
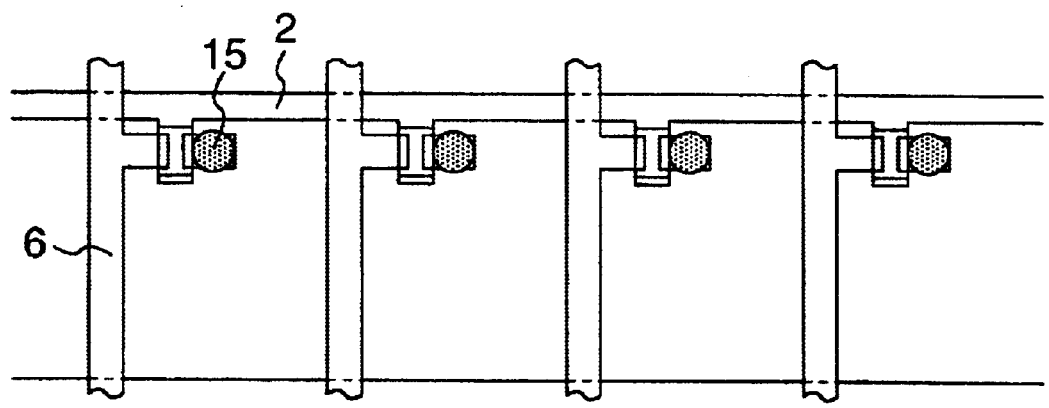
FIG. 23 is a third schematic diagram for showing the arrangement of the column-shaped spacer provided in the color crystal panel.

FIG. 20 is an arranging example of a display region 24 and external terminal regions 25 and 26 in a liquid crystal panel. The inorganic insulating layer as explained in the above-explained first embodiment is formed to substantially completely cover the entire surface of the substrate, and also covers and protects an external electrode terminal which is provided every wiring at the peripheral portion of the element substrate 1.

Furthermore, when the color filter layer is formed, the external electrode terminal is also covered with the lower flatted film layer and the upper protection film layer, and the external electrode terminal is exposed by forming an opening. When an opening of the inorganic insulator is formed in the pixel region, the inorganic insulating film is removed even in the external electrode element region, so that an opening for a driver IC connection is formed. When the ITO pixel electrode is formed on the color filter layer, the external electrode terminal region is covered with a mask to form a film in the display region. When the ITO pixel electrode pattern is formed, the external electrode terminal region is covered with a resist film to protect the external electrode terminal with respect to the etching fluid for ITO.

Thereafter, the resist film is removed, so that the external electrode terminal provided every wiring at the peripheral portion of the element substrate is covered with the inorganic insulating film, and further covered with the lower flatted film layer or the upper protection film layer which constitute the color filter layer. As a result, the substrate having the opening for exposing the external electrode terminal is formed.

Subsequently, a description will now be made of a method for forming an external electrode terminal portion, which is provided every wiring at the peripheral portion of the element substrate, with reference to the above-explained eighth embodiment.

The inorganic insulating layer as explained in the above-explained eighth embodiment is formed to substantially completely cover the entire surface of the substrate, and also to cover and protect the external electrode terminal which is provided every wiring at the peripheral portion of the element substrate.

Thereafter, when the color filter layer is formed, the external electrode terminal is also covered with the lower flatted film layer and the upper protection film layer of the color filter layer. Then, the color filter layer is removed in the pixel region while using an organic silicon-series resin mask, and also an opening for exposing the external electrode terminal is also formed in the external electrode terminal region. When the opening of the inorganic insulating film is formed in the pixel region, the inorganic insulating film is removed even in the external electrode element region to form the opening for the driver IC connection.

When the ITO pixel electrode is formed on the color filter layer, the external electrode terminal region is covered with a mask to form a film in the display region. When the ITO pixel electrode pattern is formed, the external electrode terminal region is covered with a resist film to protect the external electrode terminal with respect to the etching fluid for ITO.

Thereafter, the resist film is removed, so that the external electrode terminal, which is provided every wiring at the peripheral portion of the element substrate, is covered with the inorganic insulating film, and also is covered with the lower flatted film layer or the upper protection film layer which constitute the color filter layer. As a result, the element substrate having the opening for exposing the external electrode terminal is formed.

Figure 24A:
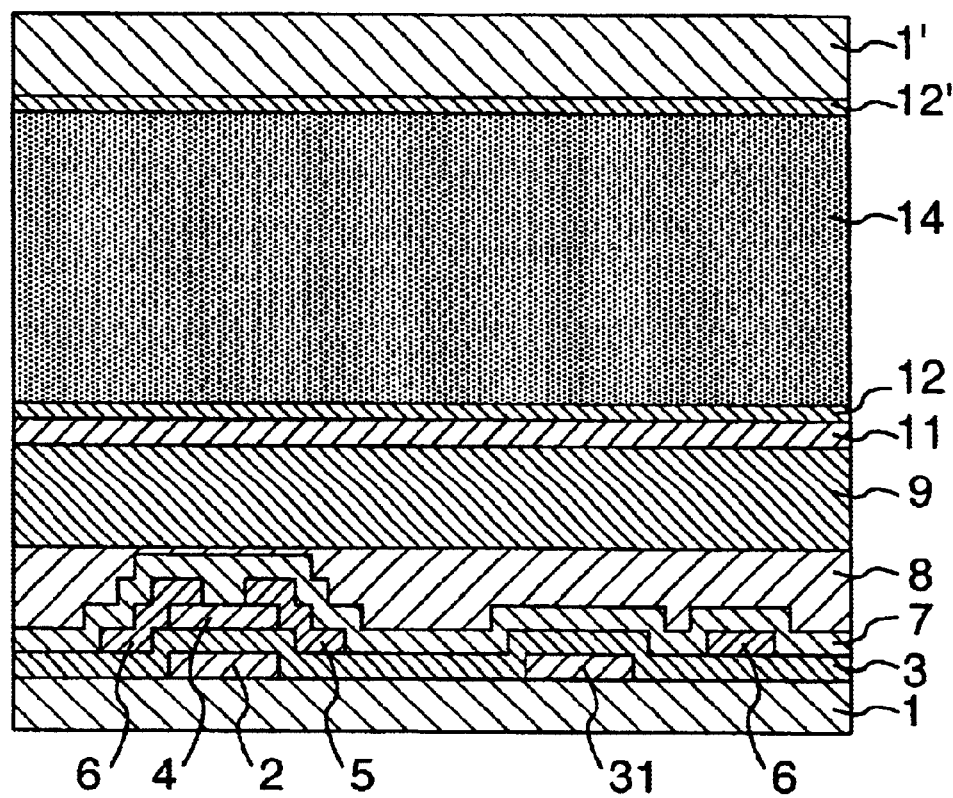
FIGS. 24A and 24B are sectional views of a color liquid crystal panel for explaining a tenth embodiment.
Figure 24B:
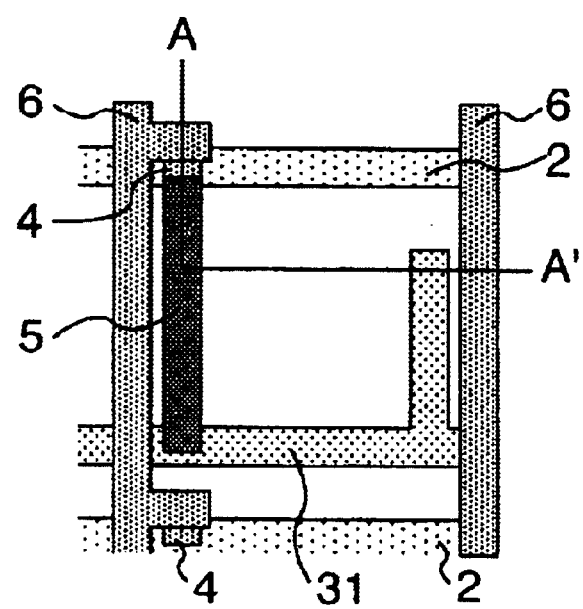

FIG. 24 is a sectional view and a plan view of a color liquid crystal panel according to a tenth embodiment. Here, FIG. 24A is the sectional view of the color liquid crystal panel, taken along line A—A' of the structure shown in FIG. 24B.

The present embodiment is different from the above-explained first to ninth embodiments in that any opening portion is not provided, and in that the common electrode is provided on the same side of the pixel electrode (source electrode) with respect to the liquid crystal layer.

In FIGS. 24A and 24B, the scanning signal electrode (gate electrode) 2 and a common electrode 31 are formed on the substrate 1, on which the insulating film 3 for covering these electrodes is formed. The thin-film transistor (TFT) 4 is formed via the insulating film 3 on the scanning signal electrode 2. Next, the picture signal electrode (drain electrode) 6 and the pixel electrode (source electrode) 5 are formed, and then the insulating film 7 for covering the entire substrate is formed. The lower flatted layer 8 of the color filter layer which is transparent in the visible light region is formed on the substrate. The color filter 9 is formed on the lower flatted layer 8, and then the color filter surface protection film 11 for covering the surface is formed on the color filter 9.

For the substrate 1 on which the element wiring and the color filter are formed in the above-explained manner, and the substrate 1' which is arranged opposite to the substrate 1 with sandwiching the liquid crystal layer 14, the polyimide orientation films 12 and 12' for orientating the liquid crystal to the display region are formed on the surface layers thereof. A voltage for producing an image is applied between the pixel electrode (source electrode) 5 and the common electrode 31.

In accordance with the structure of the tenth embodiment, the direction of the electric field applied to the liquid crystal can be made substantially parallel to the surface of the substrate 1 (or substrate 1'). As a result, there is a merit that the viewing angle of the display apparatus can be enlarged as compared with that of the first to ninth embodiments.

As inventions which are related to the invention described in Claims and are described in the above-explained embodiments, there are the following structures.

(1) The structure in which the inorganic insulating layer is removed by way of the dry etching while the color filter is used as a mask, to expose the lower wiring layer, and the opening portion for connecting the lower wiring layer and the pixel electrode is formed; (2) The structure in which the gap with respect to the liquid crystal layer held between the substrates is controlled by the column-shaped spacer; (3) The structure in which the column-shaped spacer is formed in the opening portion for connecting the pixel electrode and the lower wiring layer; (4) The structure in which the color filter layer is removed by way of the dry etching while the photosensitive resist made of the organic silicon-series material is used as a mask, to form the above-described opening in the color filter layer; and so forth.

It should be understood that the concrete numeral values are used to explain the film thickness, the processing temperature, the processing time or the like in the above-described embodiments, but the scope of the present invention is not limited to these numeral values.

As previously described, in accordance with the present invention, the TFT element and the wiring layer are protected with the inorganic insulating layer, and the wiring material and so forth are protected by shielding the alkali developing fluid used when the color filter layer is formed, so that it is possible to avoid the malfunction and the erroneous operation of the thin-film transistor elements. Also, the thickness of the color filter pattern can be made uniform, so that the deterioration in the spectral characteristic of the color filter can be suppressed to perform the liquid crystal display in high precision and high image quality. Furthermore, the aperture ratio of the pixel can be increased, so that it is possible to improve the brightness of the liquid crystal display apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

We claim:

1. A color liquid crystal panel characterized in that:

said color liquid crystal panel comprises on one substrate of a pair of substrates which sandwich liquid crystal, thin-film transistor elements arranged in a matrix shape in correspondence with pixels;
a wiring portion of said thin-film transistor elements;
a pixel electrode connected to said wiring portion; and
a color filter layer formed between said pixel electrode and an inorganic insulating layer for covering said wiring portion of said thin-film transistor elements,
said color filter layer includes a lower light-transmission flatted layer and a primary-color-type colored filter pattern, and is provided an opening through which a connection portion of said wiring portion of said thin-film transistor elements and said pixel electrode is penetrated; and
a common electrode commonly used for plural pixels is formed on the other substrate.

2. A color liquid crystal panel as claimed in claim 1 characterized in that:

said lower light-transmission flatted layer and said primary-color-type colored pattern are made of photosensitive resin.

3. A color liquid crystal panel as claimed in claim 1 characterized in that:

said lower light-transmission flatted layer is a polyimide film in which a polyimide precursor whose molecular terminal is end-capped is imidized by heat-curing.

4. A color liquid crystal panel characterized in that:

said color liquid crystal panel comprises on one substrate of a pair of substrates which sandwich liquid crystal, thin-film transistor elements arranged in a matrix shape in correspondence with pixels;
a wiring portion of said thin-film transistor elements;
a pixel electrode connected to said wiring portion; and
a color filter layer formed between said pixel electrode and an inorganic insulating layer for covering said wiring portion of said thin-film transistor elements,
said color filter layer includes a lower light-transmission flatted layer, a primary-color-type colored filter pattern and an upper light-transmission protection layer, and is provided with an opening through which a connection portion of said wiring portion of said thin-film transistor elements and said pixel electrode is penetrated; and
a common electrode commonly used for plural pixels is formed on the other substrate.

5. A color liquid crystal panel as claimed in claim 4 characterized in that:

said lower light-transmission flatted layer, said primary-color-type colored pattern and said upper light-transmission protection layer are made of photosensitive resin.

6. A color liquid crystal panel as claimed in claim 4 characterized in that:

said lower light-transmission flatted layer and said upper light-transmission protection layer are made of thermosetting resin.

7. A color liquid crystal panel as claimed in claim 4 characterized in that:

said lower light-transmission flatted layer is a polyimide film in which a polyimide precursor whose molecular terminal is end-capped is imidized by heat-curing.

* * * * *